US008922799B2

(12) United States Patent  
　　　Ito

(10) Patent No.: US 8,922,799 B2  
(45) Date of Patent: Dec. 30, 2014

(54) IMAGE FORMING APPARATUS

(71) Applicant: Takayuki Ito, Toyokawa (JP)

(72) Inventor: Takayuki Ito, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 83 days.

(21) Appl. No.: 13/659,040

(22) Filed: Oct. 24, 2012

(65) Prior Publication Data

US 2013/0107294 A1　May 2, 2013

(30) Foreign Application Priority Data

Nov. 2, 2011　(JP) .................................. 2011-241287

(51) Int. Cl.
- G06F 3/12　(2006.01)
- H04N 1/60　(2006.01)
- H04N 1/46　(2006.01)
- G03G 5/00　(2006.01)
- G03B 27/00　(2006.01)

(52) U.S. Cl.
CPC ...................................... H04N 1/60 (2013.01)
USPC ............ 358/1.13; 358/1.9; 358/501; 399/44; 399/82; 355/405

(58) Field of Classification Search
None
See application file for complete search history.

(56) References Cited

U.S. PATENT DOCUMENTS

| 2003/0111218 A1* | 6/2003 | Iguchi et al. ................... 165/200 |
| 2003/0118932 A1* | 6/2003 | Kondou et al. ............ 430/109.2 |
| 2004/0126124 A1 | 7/2004 | Inoue et al. |
| 2008/0226323 A1* | 9/2008 | Park ................................ 399/68 |
| 2009/0147286 A1* | 6/2009 | Yano et al. ..................... 358/1.9 |

(Continued)

FOREIGN PATENT DOCUMENTS

| JP | 03-142482 | 6/1991 |
| JP | 10-181927 | 7/1998 |

(Continued)

OTHER PUBLICATIONS

Notification of Reasons for Refusal issued in corresponding Japanese Patent Application No. 2011-241287, mailed Oct. 1, 2013, and English translation thereof.

Primary Examiner — Madelein A Nguyen  
(74) Attorney, Agent, or Firm — Buchanan Ingersoll & Rooney P.C.

(57) ABSTRACT

Provided is an image forming device that has a duplex printing function, and suspends execution of a printing operation to allow internal temperature to decrease when the internal temperature increases and reaches predetermined limit temperature at which toner in a developing unit is fusible, the image forming device storing, each time a print job is received, the received print job therein as a waiting print job; selecting, from among a plurality of waiting print jobs, a print job that is estimated to cause the smallest increase in the internal temperature as a print job to be executed preferentially, based on printing conditions set on the respective waiting print jobs; and controlling execution order of the waiting print jobs so that the selected print job is executed preferentially.

15 Claims, 7 Drawing Sheets

(56) References Cited

U.S. PATENT DOCUMENTS

| | | | |
|---|---|---|---|
| 2009/0214237 A1* | 8/2009 | Ozeki | 399/44 |
| 2010/0097669 A1* | 4/2010 | Roscoe et al. | 358/504 |
| 2010/0328698 A1* | 12/2010 | Toriyabe | 358/1.14 |
| 2011/0229183 A1* | 9/2011 | Seki et al. | 399/82 |
| 2011/0261102 A1* | 10/2011 | Kurasawa et al. | 347/16 |
| 2012/0008967 A1* | 1/2012 | Shibuya et al. | 399/44 |
| 2012/0063802 A1* | 3/2012 | Suzuki et al. | 399/82 |
| 2012/0134692 A1* | 5/2012 | Soda | 399/44 |
| 2014/0022584 A1* | 1/2014 | Jones | 358/1.14 |
| 2014/0064809 A1* | 3/2014 | Yamaguchi et al. | 399/341 |

FOREIGN PATENT DOCUMENTS

| | | |
|---|---|---|
| JP | 2002-067446 | 3/2002 |
| JP | 2004-212968 | 7/2004 |
| JP | 2005-017395 | 1/2005 |
| JP | 2005-297313 | 10/2005 |
| JP | 2007-328737 | 12/2007 |
| JP | 2009-237119 A | 10/2009 |

* cited by examiner

FIG. 4

| Print job No. | Print format | Number of copies to be printed | Number of copies printable | Time of receipt of print job |
|---|---|---|---|---|
| 1 | Monochrome Duplex | 5 | 8 | 2011/6/1 10:04:05 |
| 2 | Monochrome Duplex | 10 | 8 | 2011/6/1 10:04:08 |
| 3 | Monochrome Simplex | 20 | 20 | 2011/6/1 10:04:08 |
| 4 | Monochrome Simplex | 15 | 20 | 2011/6/1 10:04:15 |

IMAGE FORMING APPARATUS

CROSS-REFERENCE TO RELATED APPLICATIONS

This application is based on application No. 2011-241287 filed in Japan, the contents of which are hereby incorporated by reference.

BACKGROUND OF THE INVENTION (1) Field of the Invention

The present invention relates to an image forming device such as a printer and a copier, and in particular to technology for controlling execution of a print job in an image forming device that has a duplex printing function and suspends execution of a printing operation to allow internal temperature of the device to decrease when the internal temperature increases and reaches temperature at which toner in a developing unit is fusible.

(2) Related Art

In recent years, toner that fuses at low temperature has been used in an image forming device such as a printer and a copier, for the purpose of reducing energy consumption. Such toner should fuse due to a heat fixing operation, but is likely to fuse due to an increase in internal temperature of the device. Especially in an image forming device having a duplex printing function, toner is likely to fuse because a recording sheet having been heated due to a heat fixing operation performed on one side thereof in a fixing device is circulated and conveyed in the image forming device, and, as a result, the heat of the recording sheet is transferred to the toner in a developing unit.

To address this issue, an image forming device having a duplex printing function suspends a printing operation to allow the internal temperature to decrease, when the internal temperature increases to predetermined limit temperature at which toner is fusible due to frequent execution of a duplex printing operation and other causes (Japanese Patent Application Publication No. 2009-237119).

With this configuration, since the internal temperature is controlled so that toner in a developing unit does not fuse, it is possible to effectively prevent such problems that the toner in the developing unit fuses due to an increase in the internal temperature, and, as a result, an image forming operation is interfered with and image degradation and other troubles occur.

In the above-mentioned image forming device, however, a printing operation is suspended when the internal temperature increases. For example, when print jobs for performing duplex printing are received in succession and then print jobs for performing simplex printing are received in succession, if these print jobs are executed in the order in which they have been received, the internal temperature soon reaches temperature at which toner is fusible, due to continuous execution of the print jobs for performing duplex printing. As a result, a printing operation is suspended soon. This leads to such problems that the number of printing jobs completed before the suspension is reduced, and thus efficiency of a printing operation before the suspension is not improved.

SUMMARY OF THE INVENTION

The present invention has been conceived in view of the above-mentioned problems, and aims to improve, in an image forming device that has a duplex printing function, and suspends execution of a printing operation to allow the internal temperature to decrease when the internal temperature increases and reaches the limit temperature at which toner in a developing unit is fusible, efficiency of a printing operation before the suspension.

In order to achieve the above-presented aim, an image forming device pertaining to one aspect of the present invention is an image forming device that has a duplex printing function, and suspends execution of a printing operation to allow internal temperature to decrease when the internal temperature increases and reaches predetermined limit temperature at which toner in a developing unit is fusible, the image forming device comprising: a storage unit configured to store, each time a print job is received, the received print job therein as a waiting print job; a selection unit configured to select, from among a plurality of waiting print jobs, a print job that is estimated to cause the smallest increase in the internal temperature as a print job to be executed preferentially, based on printing conditions set on the respective waiting print jobs; and a control unit configured to control execution order of the waiting print jobs so that the selected print job is executed preferentially.

BRIEF DESCRIPTION OF THE DRAWINGS

These and other objects, advantages and features of the invention will become apparent from the following description thereof taken in conjunction with the accompanying drawings those illustrate a specific embodiments of the invention.

In the drawings:

FIG. 4 shows an example of a waiting job list;

DESCRIPTION OF PREFERRED EMBODIMENTS

The following describes an embodiment of an image forming device pertaining to one aspect of the present invention by taking a case where it is applied to a tandem-type color digital printer (hereinafter, simply referred to as a "printer") as an example.

[1] Configuration of Printer

Figure 1:
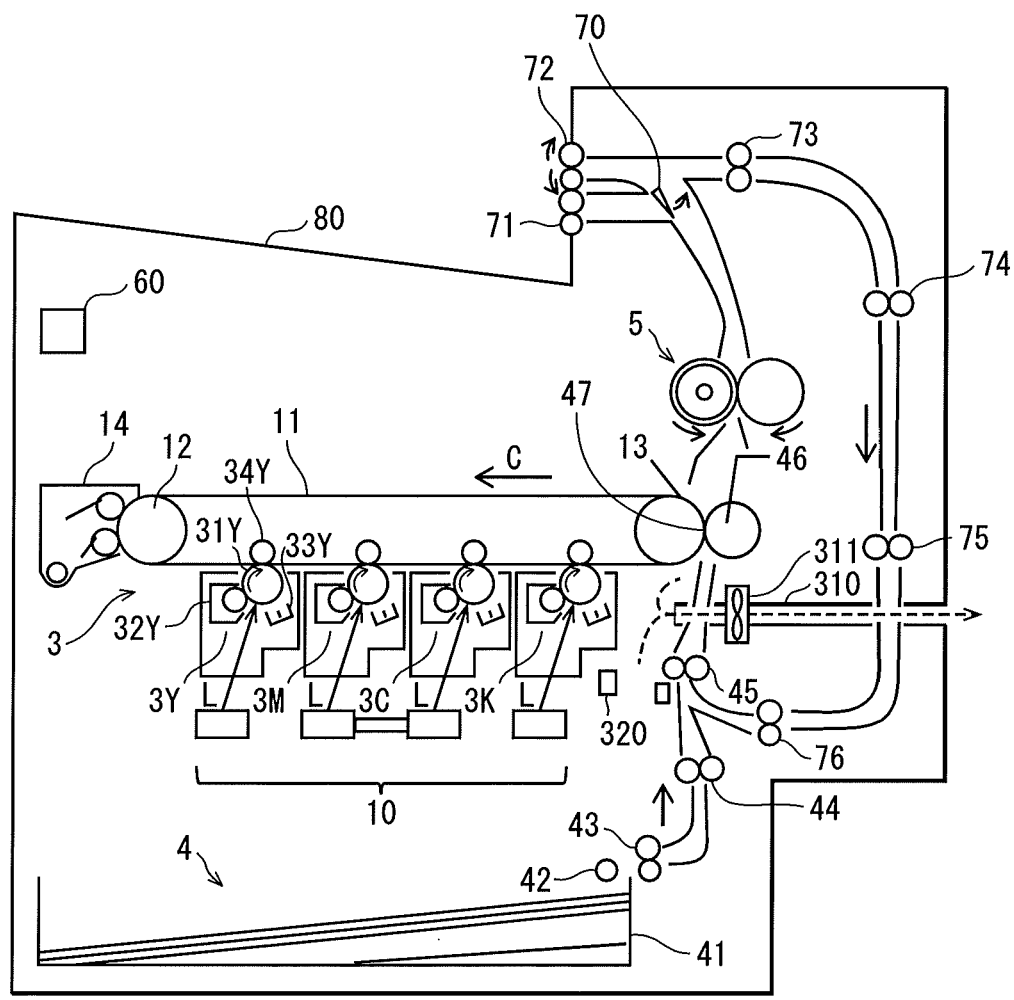
FIG. 1 illustrates a configuration of a printer 1.

The configuration of the printer 1 in the present embodiment is described first. FIG. 1 shows the configuration of the printer 1 in the present embodiment. As shown in FIG. 1, the printer 1 includes an image process unit 3, a paper feed unit 4, a fixing unit 5, and a control unit 60.

The printer 1 is connected to a network (e.g. LAN). Upon receiving an instruction to perform printing from one or more external terminal devices (not illustrated), an operation panel (not illustrated), and the like, the printer 1 forms toner images of respective colors including yellow, magenta, cyan, and black according to the received instruction, and forms a full color image by multi-transferring the toner images. The printer 1 performs a printing operation on a recording sheet in the above-mentioned manner. Hereinafter, reproduction colors of yellow, magenta, cyan, and black are respectively represented by Y, M, C, and K. Y, M, C, and K are added to reference signs of components relating to respective reproduction colors.

The image process unit 3 includes imaging units 3Y, 3M, 3C, and 3K, an exposure unit 10, an intermediate transfer belt 11, and a secondary transfer roller 46. The following mainly describes the configuration of the imaging unit 3Y, since the imaging units 3Y, 3M, 3C, and 3K are similar in configuration.

The imaging unit 3Y includes a photoreceptor drum 31Y, and a developing unit 32Y, a charger 33Y, and a primary transfer roller 34Y that are disposed around the photoreceptor drum 31/The imaging unit 3Y forms a toner image of Y color on the photoreceptor drum 31Y. The developing unit 32Y is disposed opposite the photoreceptor drum 31Y, and conveys charged toner to the photoreceptor drum 31Y.

The intermediate transfer belt 11 is an endless belt that is bridged in a tensioned state between a driven roller 12 and a driving roller 13, and is driven to rotate in a direction of an arrow C. In the vicinity of the driven roller 12, a cleaner 14 for removing toner remaining on the intermediate transfer belt is disposed.

The exposure unit 10 includes a light-emitting element such as a laser diode. The exposure unit 10 emits laser light L for forming images of Y, M, C, and K colors by a drive signal transmitted from the control unit 60, and performs exposure scanning on the photoreceptor drums included in the respective imaging units 3Y, 3M, 3C, and 3K. By the exposure scanning, an electrostatic latent image is formed on the photoreceptor drum 31Y charged by the charger 33Y. An electrostatic latent image is formed in a similar manner on each of the photoreceptor drums included in the respective imaging units 3M, 3C, and 3K.

The electrostatic latent images formed on the respective photoreceptor drums are developed by the developing units included in the respective imaging units 3Y, 3M, 3C, and 3K, so that toner images of respective colors are formed on the respective photoreceptor drums. The formed toner images are sequentially primary-transferred by the respective primary transfer rollers (in FIG. 1, only a primary transfer roller included in the imaging unit 3Y is assigned with a reference sign 34Y, and reference signs of the other primary transfer rollers are omitted) included in the imaging units 3Y, 3M, 3C, and 3K at different timings so that the formed toner images are primary-transferred onto the same position on the intermediate transfer belt 11 in layers. Then, the toner images formed on the intermediate transfer belt 11 are collectively secondary-transferred onto a recording sheet by electrostatic force applied by the secondary transfer roller 46.

The photoreceptors included in the respective imaging units 3Y, 3M, and 3C are used in color printing, and are configured to be movable toward and away from the intermediate transfer belt 11 so that they are separated from the intermediate transfer belt 11 in monochrome printing and are in contact with the intermediate transfer belt 11 in color printing.

Figure 2:
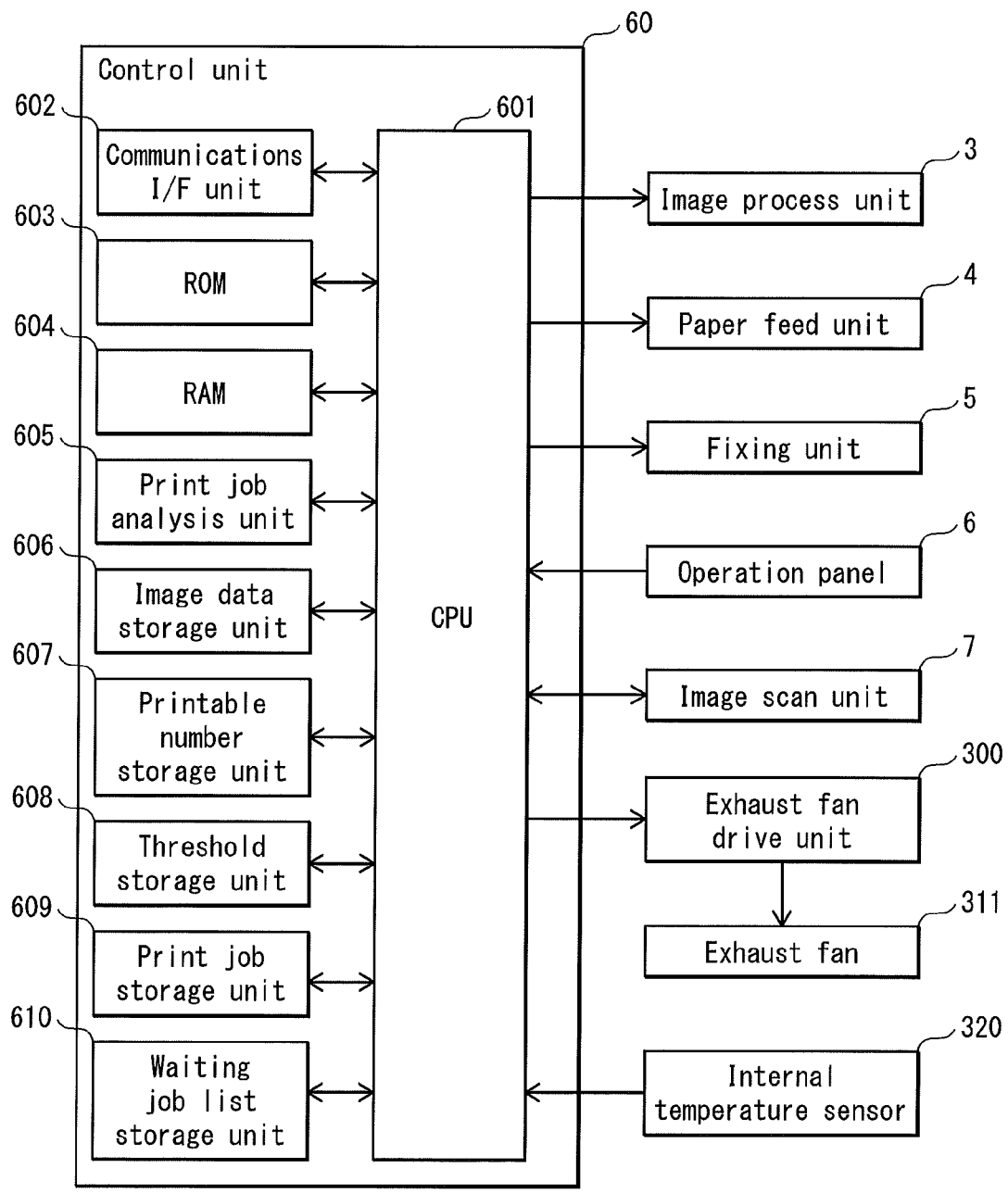
FIG. 2 shows a configuration of a control unit 60, and relationships between the control unit 60 and main components to be controlled by the control unit 60.
Figure 3:
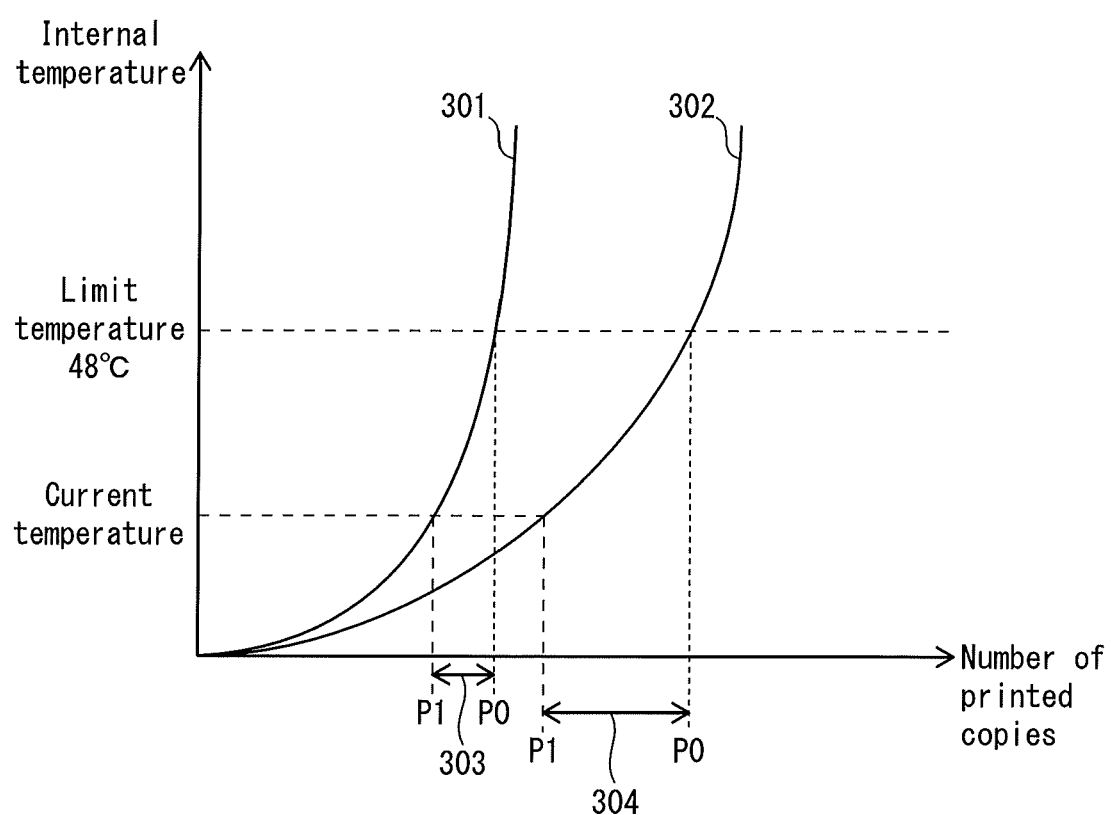
FIG. 3 shows examples of a printable number specification curve.

As a mechanism that brings the photoreceptors into contact with the intermediate transfer belt in color printing and separates the photoreceptors from the intermediate transfer belt in monochrome printing, a mechanism of a belt device using an electromagnetic clutch, a clutch gear, an arm, and the like disclosed in Patent Literature (Japanese Patent Application Publication No. 10-181927) can be used, for example (see paragraphs 43, 44, and 52 to 55 in the specification, and FIGS. 2 and 3.)

The recording sheet onto which the toner images are secondary-transferred is conveyed to the fixing unit 5, and the fixing unit 5 thermally fixes, onto the recording sheet, the toner images (unfixed images) on the recording sheet by applying heat and pressure.

In simplex printing, after the thermal fixing, the recording sheet is conveyed to ejection rollers 71 via a switch guide member 70 and is ejected by the ejection rollers 71 onto an ejection tray 80. In duplex printing, the recording sheet onto one side of which the toner images are thermally fixed is conveyed to reverse rollers 72 via the switch guide member 70.

When the recording sheet onto one side of which the toner images are thermally fixed is conveyed to the reverse rollers 72, the reverse rollers 72 reverse a conveyance direction of the recording sheet, so that the recording sheet is conveyed to conveyance rollers 73 via the switch guide member 70. The recording sheet conveyed to the conveyance rollers 73 is further conveyed to the conveyance rollers 74, 75, and 76, guided to timing rollers 45, and turned over.

The recording sheet onto one side of which the toner images are thermally fixed is conveyed to a secondary transfer position 47 again via the timing rollers 45, and toner images are secondary-transferred onto the other side of the recording sheet, onto which the toner images have not been thermally fixed. The secondary-transferred toner images are thermally fixed by the fixing unit 5, and the recording sheet is conveyed to the ejection rollers 71 via the switch guide member 70, and ejected by the ejection rollers 71 onto the ejection tray 80. The toner images are thermally fixed onto both sides of the recording sheet in the above-mentioned manner, and duplex printing on the recording sheet is completed.

The switch guide member 70 is disposed at a point where a conveyance path from the fixing unit 5 to the ejection rollers 71 and a conveyance path from the fixing unit 5 and the reverse rollers 72 meet each other. By moving around its axis forward and backward, the switch guide member 70 switches a path to which the recording sheet is conveyed between the conveyance path to the ejection rollers 71 and the conveyance path to the reverse rollers 72. The switch guide member 70 is moved, for example, by a drive motor. The movement of the switch guide member 70 is controlled by the control unit 60 controlling the drive of the drive motor.

Inside the device, an exhaust duct 310 and an exhaust fan 311 are provided to exhaust heated air remaining in the vicinity of the imaging units. With this configuration, the remaining heated air is exhausted and toner in the developing unit is prevented from fusing due to the influence of the remaining heated air. Furthermore, an internal temperature sensor 320 is provided in the vicinity of the imaging unit 3K to measure the internal temperature.

The paper feed unit 4 includes a paper feed cassette 41 for storing therein one or more recording sheets, a pick-up roller 42 that picks up one of the recording sheets stored in the paper feed cassette 41 at a time to a conveyance path, the conveyance rollers 43 and 44 that convey the picked-up recording sheet to the timing rollers 45, and the timing rollers 45 that measure a timing at which the picked-up recording sheet is conveyed to the secondary transfer position 47.

The number of paper feed cassettes is not limited to one, and may be plural. As the recording sheets, recording sheets having different sizes or thicknesses (plain paper, thick paper) and a film sheet such as an OHP sheet can be used. When there are a plurality of paper feed cassettes, recording sheets may separately be stored in the paper feed cassettes according to the size, thickness, and material thereof.

The timing rollers 45 convey the recording sheet to the secondary transfer position 47 in accordance with a timing at which the toner images primary-transferred onto the same position on the intermediate transfer belt 11 in layers are transferred to the secondary transfer position 47, and brings the recording sheet into contact with the intermediate transfer belt 11. The toner images formed on the intermediate transfer belt 11 are collectively secondary-transferred onto the recording sheet by the secondary transfer roller 46.

Each of the pick-up roller 42, the conveyance rollers 43 and 44, and the timing rollers 45 is driven, by a conveyance motor (not illustrated), to rotate via a power transmission mechanism (not illustrated) such as gear and a belt. As the conveyance motor, a stepping motor configured to control a rotational speed with a high degree of accuracy is used, for example.

The fixing unit 5 includes a fixing roller and a pressure roller. The recording sheet onto which toner images are secondary-transferred is inserted into a fixing nip formed between these rollers, and heated in a state where pressure is applied to the recording sheet. As a result, the toner images are thermally fixed onto the recording sheet. The fixing roller contains a heating element such as a halogen heater. The temperature of the fixing unit 5 is controlled by the control unit 60 performing on-off control of the heating element. The method for heating the fixing unit is not limited to a heat roller method as described above, and may be an electromagnetic induction heating method or a heating method using a resistance heating element.

The fixing roller is driven to rotate by driving force of a drive motor and the like. Following the rotation of the fixing roller, the pressure roller is driven to rotate. The rotation is controlled by the control unit 60.

[2] Configuration of Control Unit

FIG. 2 shows the configuration of the control unit 60, and relationships between the control unit 60 and main components to be controlled by the control unit 60. The control unit 60 is a so-called computer and has a clock function. As shown in FIG. 2, the control unit 60 includes a CPU (Central Processing Unit) 601, a communications interface (I/F) unit 602, ROM (Read Only Memory) 603, RAM (Random Access Memory) 604, a print job analysis unit 605, an image data storage unit 606, a printable number storage unit 607, a threshold storage unit 608, a print job storage unit 609, and a waiting job list storage unit 610.

The communications I/F unit 602 is an interface for connecting to a LAN such as a LAN card and a LAN board. In the ROM 603, a program necessary for controlling the image process unit 3, the paper feed unit 4, the fixing unit 5, an operation panel 6, an image scan unit 7, an exhaust fan drive unit 300, the internal temperature sensor 320, and the like, as well as a program for controlling an operation of print job preferential execution processing (described later) are stored. The RAM 604 is used as a work area when the CPU 601 executes the programs.

Each time a print job is received from a terminal device via the communications I/F unit 602, the print job analysis unit 605 (i) analyzes the received print job, (ii) acquires a printing condition set on the received print job, a print job ID for identifying the received print job, and a time of receipt of the received print job, (iii) calculates the number of copies printable for the received print job based on the acquired printing condition using a printable number specification curve (described later) corresponding to the acquired printing condition, and (iv) stores, in the waiting job list storage unit 610, the acquired print job ID, printing condition, and time of receipt of the received print job, and the calculated number of copies printable for the received print job in association with one another.

The print job described in the present embodiment refers to data generated by each terminal device connected to the printer 1 by a network, and includes print data targeted for printing, a print job identifier such as the print job ID, the printing condition, and information for identifying a user who has transmitted the print job. The print data is written in a PDL (Page Description Language), and the other information is written in a PJL (Printer Job Language), which is a language for controlling a print job developed by Hewlett-Packard.

The printing condition includes information relating to a print format (e.g. duplex print format, simplex print format, color print format, and monochrome print format), and information indicating the number of copies to be printed, a paper size, and a paper type (e.g. a plain paper, a thick paper, and a thin paper.)

The print job analysis unit 605 also reads print data stored in the print job storage unit 609, analyzes the read print data, expands the analyzed print data into bitmap data, and causes the image process unit 3 to form an image based on the bitmap data.

The image data storage unit 606 stores therein image data for printing input from the image scan unit 7 and image data for printing expanded into the bitmap data by the print job analysis unit 605.

The printable number storage unit 607 stores therein a plurality of printable number specification curves for respective print formats. Each of the printable number specification curves described in the present embodiment refers to a curve indicating correspondence relationships between the number of printed copies and the internal temperature. The curve is used to estimate the number of copies printable before the internal temperature reaches the temperature at which toner in the developing unit included in the printer 1 is fusible (hereinafter, referred to as "limit temperature".) The limit temperature is set in advance by a manufacturer of the device.

The printable number specification curves are created for respective print formats (specifically, a monochrome simplex print format, a monochrome duplex print format, a color simplex print format, and a color duplex print format). The created printable number specification curves are stored in the printable number storage unit 607, for example, as function formulas. Instead of using the function formulas, a table indicating the correspondence relationships between the number of printed copies and the internal temperature may be stored in the printable number storage unit 607.

The printable number specification curves may be created in advance in the following manner. The manufacturer executes a printing operation continuously for each print format by using the printer 1, measures the internal temperature each time a predetermined number of copies (e.g. one copy) is printed, and plots the correspondence relationships between the number of printed copies and the internal temperature on X and Y coordinates.

FIG. 3 shows examples of the printable number specification curve. Reference signs 301 and 302 in FIG. 3 respectively indicate the printable number specification curve for a monochrome duplex print format and the printable number specification curve for a monochrome simplex print format.

Upon receipt of a print job from a terminal device connected to the printer 1 by a network, the number of copies printed when the internal temperature is the limit temperature (P0) and the number of copies printed when the internal temperature is the current temperature (P1) are calculated by using the printable number specification curve corresponding to a print format specified by a printing condition set on the received print job. A difference between the calculated numbers (P0–P1) indicates the number of copies printable for the received print job (see a range indicated by an arrow 303 (in the printable number specification curve for a duplex print format 301) and a range indicated by an arrow 304 (in the printable number specification curve for a simplex print format 302) in FIG. 3.)

The threshold storage unit 608 stores therein the limit temperature, set temperature, and a predetermined time period that are used to make a judgment in the print job preferential execution processing (described later.) The set temperature is temperature lower than and close to the limit temperature (e.g. the internal temperature that can reach the limit temperature if a duplex printing operation is executed one or two more times), and is, for example, 35° C. when the limit temperature is 48° C. The predetermined time period is a maximum time period during which a print job waits to be executed, and is, for example, 30 minutes.

The print job storage unit 609 stores therein one or more print jobs received from a terminal device connected to the printer 1 by a network. The waiting job list storage unit 610 stores therein a waiting job list. The waiting job list described in the present embodiment is a list of waiting print jobs having been received from one or more terminal devices connected to the printer 1 by a network. Specifically, the waiting job list is a list showing correspondence relationships among a print job ID for identifying a waiting print job, a printing condition set on the waiting print job (a print format and the number of copies to be printed in the present embodiment), the number of copies printable for the waiting print job, and a time of receipt of the waiting print job. When the waiting print job is executed, the executed print job is deleted from the waiting job list. FIG. 4 shows an example of the waiting job list.

The operation panel 6 includes a plurality of input keys and a liquid crystal display unit. A touch panel is laminated on a surface of the liquid crystal display unit. The operation panel 6 receives an instruction from a user through touch input on the touch panel and key input on the input keys, and notifies the control unit 60 of the received instruction.

The image scan unit 7 includes an image input device such as a scanner. The image scan unit 7 scans information on characters and a figure appearing on a recording sheet such as a paper, and forms image data. The exhaust fan drive unit 300 drives the exhaust fan 311 according to an instruction from the control unit 60. The internal temperature sensor 320 measures internal temperature of the printer 1, and outputs the measurement result to the control unit 60.

[3] Print Job Preferential Execution Processing

Figure 5:
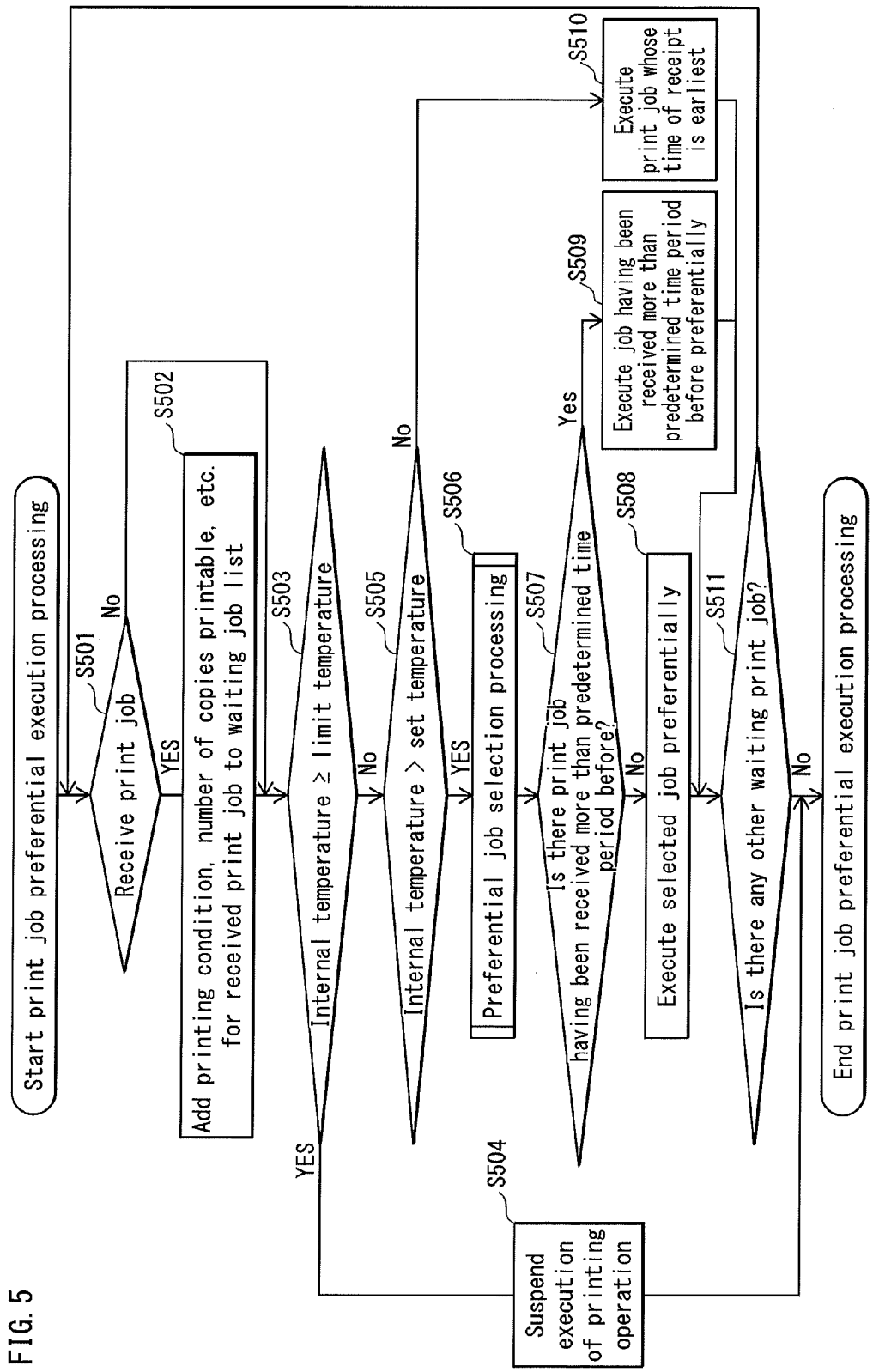
FIG. 5 is a flow chart showing an operation of print job preferential execution processing performed by the control unit 60.

FIG. 5 is a flow chart showing an operation of the print job preferential execution processing performed by the control unit 60. Upon receipt of a print job from a terminal device connected to the printer 1 by a network (step S501: YES), the control unit 60 acquires a printing condition (a print format and the number of copies to be printed in the present embodiment) set on the received print job, a print job ID for identifying the received print job, and a time of receipt of the received print job, calculates the number of copies printable for the received print job using the printable number specification curve corresponding to a print format indicated by the acquired printing condition, and adds, to the waiting job list stored in the waiting job list storage unit 610, the acquired print job ID, printing condition, and time of receipt of the received print job, and the calculated number of copies printable for the received print job in association with one another (step S502.)

Furthermore, the control unit 60 acquires the current internal temperature from the internal temperature sensor 320, and judges whether or not the internal temperature reaches the limit temperature stored in the threshold storage unit 608 (step S503.) When the internal temperature reaches the limit temperature (step S503: YES), the control unit 60 suspends execution of a printing operation (step S504). When the internal temperature does not reach the limit temperature (step S503: NO), the control unit 60 further judges whether or not the internal temperature exceeds the set temperature (step S505.)

When the internal temperature exceeds the set temperature (step S505: YES), the control unit 60 performs preferential job selection processing described later (step S506), acquires the current time, and judges whether or not there is a waiting print job having been received more than a predetermined time period before, with reference to the time of receipt of the waiting print job indicated in the waiting job list stored in the waiting job list storage unit 610 (step S507.)

When there is no waiting print job having been received more than the predetermined time period before (step S507: NO), the control unit 60 executes a waiting print job selected in the processing in the step S506 preferentially (step S508), deletes the executed print job from the waiting job list, and, after the execution of the print job is completed, judges whether or not there is any other waiting print job with reference to the waiting job list (step S511.) When there is the other waiting print job, the control unit 60 proceeds to the processing in the step S501.

When judging affirmatively in the step S507 (step S507), the control unit 60 executes a waiting print job having been received more than the predetermined time period before preferentially (step S509), and proceeds to the processing in the step S511. When there are a plurality of waiting print jobs each having been received more than the predetermined time period before, the control unit 60 sequentially executes the waiting print jobs in the order in which they have been received.

When judging negatively in the step S505 (step S505: NO), the control unit 60 executes a print job whose time of receipt is the earliest of all the print jobs stored in the waiting job list (step S510), and proceeds to the processing in the step S511.

Figure 6:
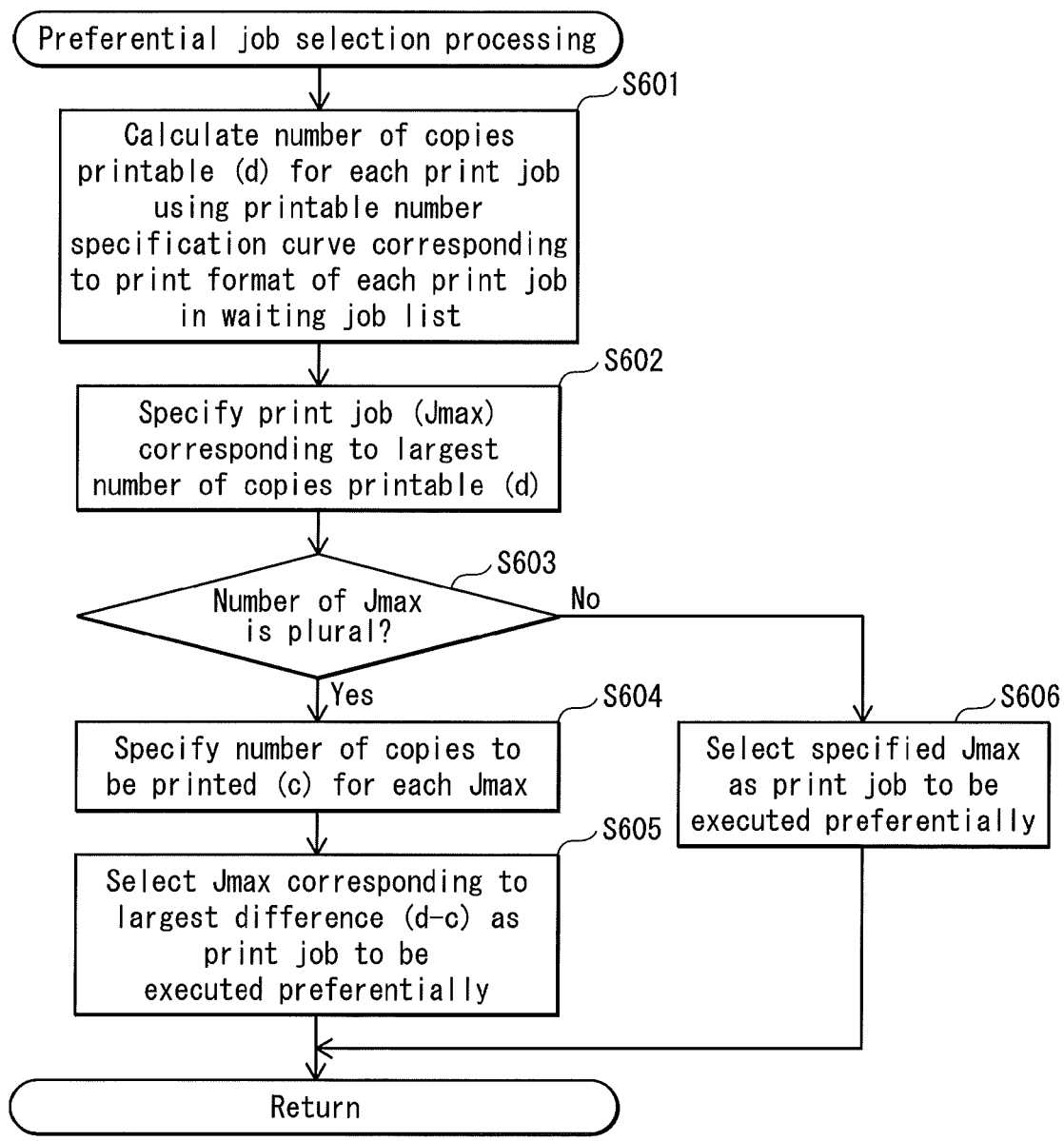
FIG. 6 is a flow chart showing an operation of preferential job selection processing performed by the control unit 60.

The following describes an operation of the preferential job selection processing performed by the control unit 60. FIG. 6 is a flow chart showing the operation. The control unit 60 calculates the number of copies printed when the internal temperature is the limit temperature and the number of copies printed when the internal temperature is the current temperature by using the printable number specification curve corresponding to a print format of each waiting print job shown in the waiting job list stored in the waiting job list storage unit 610. The control unit 60 then calculates a difference between the calculated numbers to calculate the number of copies printable (d) for each waiting print job (step S601), and specifies at least one print job corresponding to the largest number copies printable (d) as Jmax (step S602.)

When a plurality of print jobs are specified as Jmax (step S603: YES), the control unit 60 specifies the number of copies to be printed (c) for each of the print jobs specified as Jmax with reference to the waiting job list (step S604), and selects, from among the print jobs specified as Jmax, a print job corresponding to the largest difference (d−c) between the number of copies printable and the number of copies to be printed (corresponding to the smallest number of copies to be printed) as a print job to be executed preferentially (step S605.) When a plurality of print jobs are not specified as Jmax (step S603: NO), the control unit 60 selects the print job specified as Jmax as the print job to be executed preferentially (step S606.)

With this structure, it is possible to select, from among waiting print jobs, a waiting print job corresponding to the largest number of copies printable, i.e. the lowest rate of increase in the internal temperature due to execution of the print job (an increase in the internal temperature per one copy to be printed), as a print job to be executed preferentially, and to execute the selected print job preferentially. Therefore, the number of printing jobs completed before the internal temperature reaches the limit temperature and the printing operation is suspended increases, and efficiency of a printing operation can be improved accordingly.

Furthermore, from among waiting print jobs, a waiting print job having been received more than a predetermined time period before is controlled to be executed preferentially over a waiting print job selected as the print job to be executed preferentially. Therefore, an adjustment can be made so that execution of a specific print job is not delayed too much.

(Modifications)

Although the present invention has been described based on the above-mentioned embodiment, it is obvious that the present invention is not limited to the above-mentioned embodiment. The following modifications also fall within a scope of the present invention.

(1) In the above-mentioned embodiment, a print job to be executed preferentially is selected based on the number of copies printable for each waiting print job. Instead of the number of copies printable, the print job to be executed preferentially may be selected based on a print format of each waiting print job.

Figure 7:
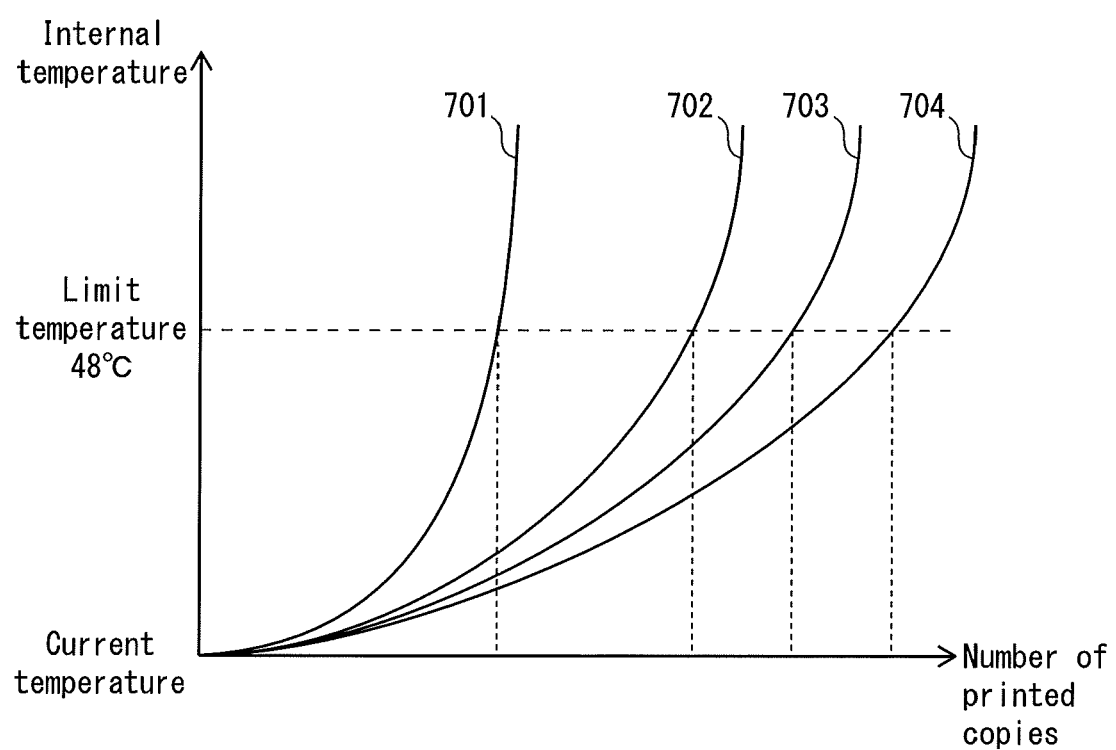
FIG. 7 shows relationships among printable number specification curves for respective monochrome simplex print format, monochrome duplex print format, color simplex print format, and color duplex print format each created using the printer 1.

Specifically, the print job to be executed preferentially may be selected based on whether a print format of each waiting print job is a monochrome print format or a color print format, and a simplex print format or a duplex print format. FIG. 7 shows relationships among the printable number specification curves for respective monochrome simplex print format, monochrome duplex print format, color simplex print format, and color duplex print format each created using the printer 1.

Reference signs 701, 702, 703, and 704 in FIG. 7 respectively indicate the printable number specification curve for a color duplex print format, the printable number specification curve for a color simplex print format, the printable number specification curve for a monochrome duplex print format and the printable number specification curve for a monochrome simplex print format. As shown in FIG. 7, the internal temperature is the most likely to increase in the color duplex print format, followed by the color simplex print format, the monochrome duplex print format, and the monochrome simplex print format in that order.

Therefore, a waiting print job that is the least likely to cause an increase in the internal temperature can be selected from among waiting print jobs as a waiting print job to be executed preferentially, according to a selection criterion that the monochrome print format is selected preferentially over the color print format, and the simplex print format is selected preferentially over the duplex print format.

For example, when print formats of waiting print jobs are a monochrome duplex print format and a color duplex print format, or a monochrome simplex print format and a color simplex print format, a monochrome print format is selected according to the selection criterion described above. Therefore, a waiting print job that is less likely to cause an increase in the internal temperature can be selected as a waiting print job to be executed preferentially.

When print formats of waiting print jobs are a monochrome duplex print format and a monochrome simplex print format, or a color duplex print format and a color simplex print format, a simplex print format is selected according to the selection criterion described above. Therefore, a waiting print job that is less likely to cause an increase in the internal temperature can be selected as a waiting print job to be executed preferentially.

For example, when print formats of waiting print jobs are a monochrome simplex print format, a monochrome duplex print format, and a color simplex print format, a monochrome simplex print format is selected according to the selection criterion described above. Therefore, a waiting print job that is the least likely to cause an increase in the internal temperature can be selected as a waiting print job to be executed preferentially.

(2) In the modification described in the section (1), when a print format is a simplex print format, a second selection criterion for selecting a print job to be executed preferentially may further be set. For example, when there are a plurality of waiting print jobs in a monochrome simplex print format, or when there are a plurality of waiting print jobs in a color simplex print format, if a paper size of a recording sheet specified by a printing condition is different for each waiting print job, a selection criterion that a waiting print job corresponding to the largest paper size is selected preferentially may be set as the second selection criterion. A larger amount of heat is transferred to a recording sheet having a larger size when the recording sheet comes into contact with the intermediate transfer belt 11 at the secondary transfer position 47, and the internal temperature can be reduced accordingly. Therefore, a waiting print job that is less likely to cause an increase in the internal temperature can be selected more appropriately.

Similarly, when there are a plurality of waiting print jobs in a monochrome simplex print format, or when there are a plurality of waiting print jobs in a color simplex print format, if a paper thickness of a recording sheet specified by a printing condition is different for each waiting print job, a selection criterion that a waiting print job corresponding to the greatest paper thickness is selected preferentially may be set as the second selection criterion. With this configuration, for a reason similar to a reason when the selection criterion that a waiting print job corresponding to the largest paper size is selected preferentially is set as the second selection criterion, a waiting print job that is less likely to cause an increase in the internal temperature can be selected more appropriately.

(3) In the above-mentioned embodiment, a time period between receipt of a print job and execution of the print job is monitored, and, when there is a waiting print job having been received more than a predetermined time period before, the waiting print job is executed preferentially over the print job selected in the preferential job selection processing. Instead of monitoring the time period, the number of other print jobs that have been executed after the receipt of the print job may be monitored, and, when the number of the other print jobs executed after receipt of a given print job exceeds a predetermined number, the given print job, which has not been executed, may be executed preferentially over the print job selected in the preferential job selection processing.

(4) In the above-mentioned embodiment, a time period between receipt of a print job and execution of the print job is monitored, and, when there is a waiting print job having been received more than a predetermined time period before, the waiting print job is executed preferentially over the print job selected in the preferential job selection processing. However, a control may be performed so that the print job selected in the preferential job selection processing is executed while the internal temperature exceeds the set temperature, and waiting print jobs are executed in the order in which they have been received when the internal temperature becomes equal to or lower than the set temperature. Specifically, in the flow chart showing the operation of the print job preferential execution processing in FIG. 5, the processing in the steps S507 and S509 may be removed.

(5) In the above-mentioned embodiment, the printable number specification curve is created for each print format, and the number of copies printable for each print job is calculated using the printable number specification curve corresponding to a print format specified by the printing condition set on the print job. As for each print format, however, the printable number specification curve may be created for each paper type (e.g. for each paper having a different thickness or a different size), and the number of copies printable for each print job may be calculated using the printable number specification curve corresponding to a print format or a paper type specified by the printing condition set on the print job.

<Summary>

An image forming device pertaining to one aspect of the present invention disclosed above is an image forming device that has a duplex printing function, and suspends execution of a printing operation to allow internal temperature to decrease when the internal temperature increases and reaches predetermined limit temperature at which toner in a developing unit is fusible, the image forming device comprising: a storage unit configured to store, each time a print job is received, the received print job therein as a waiting print job; a selection unit configured to select, from among a plurality of waiting print jobs, a print job that is estimated to cause the smallest increase in the internal temperature as a print job to be executed preferentially, based on printing conditions set on the respective waiting print jobs; and a control unit configured to control execution order of the waiting print jobs so that the selected print job is executed preferentially.

Here, the selection unit may calculate, for each of the waiting print jobs, a number of copies printable before the internal temperature reaches the limit temperature if the waiting print job is executed, based on a printing condition set on the waiting print job, and select the print job to be executed preferentially based on the calculated number of copies printable.

The storage unit may further store therein a plurality of printable number specification curves having been obtained for respective printing conditions, and each showing correspondence relationships between a number of printed copies and the internal temperature, and the selection unit may calculate the number of copies printable for each of the waiting print jobs, based on one of the printable number specification curves corresponding to a printing condition set on the waiting print job.

The selection unit may specify at least one of the waiting print jobs corresponding to the largest number of copies printable, and select the specified print job as the print job to be executed preferentially.

When there are two or more waiting print jobs corresponding to the largest number of copies printable, the selection unit may select, from among the two or more waiting print jobs, a waiting print job corresponding to the smallest number of copies to be printed as the print job to be executed preferentially.

Each of the printing conditions may include a condition indicating whether a print format is a simplex print format or a duplex print format, and, when the waiting print jobs include a waiting print job in the simplex print format and a waiting print job in the duplex print format, the selection unit may select the waiting print job in the simplex print format as the print job to be executed preferentially.

Each of the printing conditions may include a paper size, and, when the waiting print jobs are each in the simplex print format, the selection unit may select one of the waiting print jobs corresponding to the largest paper size as the print job to be executed preferentially.

Each of the printing conditions may include a paper thickness, and, when the waiting print jobs are each in the simplex print format, the selection unit may select one of the waiting print jobs corresponding to the greatest paper thickness as the print job to be executed preferentially.

Each of the printing conditions may include a condition indicating whether a print format is a color print format or a monochrome print format, and, when the waiting print jobs include a waiting print job in the color print format and a waiting print job in the monochrome print format, the selection unit may select the waiting print job in the monochrome print format as the print job to be executed preferentially.

With the above-mentioned configuration, the execution order is controlled so that the print job estimated to cause the smallest increase in the internal temperature, which has been selected from among the waiting print jobs based on the printing conditions set on the respective waiting print jobs, is executed preferentially. It is therefore possible to control the execution order so that the number of printing jobs completed before the internal temperature increases and the printing operation is suspended increases, and to improve efficiency of a printing operation accordingly.

Here, the image forming device may further comprise a measurement unit configured to measure the internal temperature, wherein, when the measured internal temperature exceeds predetermined set temperature lower than the limit temperature, the selection unit may select, from among the waiting print jobs, the print job that is estimated to cause the smallest increase in the internal temperature as the print job to be executed preferentially, based on the printing conditions set on the respective waiting print jobs, and, when the measured internal temperature does not exceed the set temperature, the selection unit may select one of the waiting print jobs whose time of receipt is the earliest of all the waiting print jobs.

With this configuration, the execution order is controlled so that the print job whose time of receipt is the earliest is executed preferentially when the measured internal temperature does not exceed the set temperature. It is therefore possible to effectively prevent execution of a print job that is likely to cause an increase in the internal temperature from being postponed at all times, and to smoothly execute the waiting print jobs.

Here, the image forming device may further comprise a monitoring unit configured to monitor an elapsed time since receipt of each print job stored as the waiting print job, wherein the control unit may control the execution order so that, when the waiting print jobs include a waiting print job having been received more than a predetermined time period before, the waiting print job having been received more than the predetermined time period before is executed preferentially over the selected print job.

With this configuration, the execution order is controlled so that, from among the waiting print jobs, the print job having been received more than the predetermined time period before is executed preferentially. It is therefore possible to make an adjustment so that execution of the print job that is likely to cause an increase in the internal temperature is not delayed too much, and to smoothly execute the waiting print jobs.

Here, the image forming device may further comprise a count unit configured to count, for each print job stored as the waiting print job, a number of other print jobs executed after receipt of the stored print job, wherein the control unit may control the execution order so that, when the number of the other print jobs executed after receipt of a given print job exceeds a predetermined number, the given print job is executed preferentially over the selected print job.

With this configuration, the execution order is controlled so that, when the number of the other print jobs executed after receipt of the given print job exceeds the predetermined number, the given print job is executed preferentially. It is therefore possible to make an adjustment so that execution of the print job that is likely to cause an increase in the internal temperature is not delayed too much, and to smoothly execute the waiting print jobs.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. An image forming device that has a duplex printing function, and suspends execution of a printing operation to allow internal temperature to decrease when the internal temperature increases and reaches a predetermined limit temperature, the image forming device comprising:
   a storage unit configured to store, each time a print job is received, the received print job therein as a waiting print job;
   a selection unit configured to select, from among a plurality of waiting print jobs, a print job that is estimated to cause the smallest increase in the internal temperature as a print job to be executed preferentially, based on printing conditions set on the respective waiting print jobs; and
   a control unit configured to control execution order of the waiting print jobs so that the selected print job is executed preferentially.

2. The image forming device of claim 1, wherein
   the selection unit calculates, for each of the waiting print jobs, a number of copies printable before the internal temperature reaches the limit temperature if the waiting print job is executed, based on a printing condition set on the waiting print job, and selects the print job to be executed preferentially based on the calculated number of copies printable.

3. The image forming device of claim 2, wherein
   the storage unit further stores therein a plurality of printable number specification curves having been obtained for respective printing conditions, and each showing correspondence relationships between a number of printed copies and the internal temperature, and
   the selection unit calculates the number of copies printable for each of the waiting print jobs, based on one of the printable number specification curves corresponding to a printing condition set on the waiting print job.

4. The image forming device of claim 2, wherein
   the selection unit specifies at least one of the waiting print jobs corresponding to the largest number of copies printable, and selects the specified print job as the print job to be executed preferentially.

5. The image forming device of claim 4, wherein
   when there are two or more waiting print jobs corresponding to the largest number of copies printable, the selection unit selects, from among the two or more waiting print jobs, a waiting print job corresponding to the smallest number of copies to be printed as the print job to be executed preferentially.

6. The image forming device of claim 1, wherein
   each of the printing conditions includes a condition indicating whether a print format is a simplex print format or a duplex print format, and
   when the waiting print jobs include a waiting print job in the simplex print format and a waiting print job in the duplex print format, the selection unit selects the waiting print job in the simplex print format as the print job to be executed preferentially.

7. The image forming device of claim 6, wherein
   each of the printing conditions includes a paper size, and
   when the waiting print jobs are each in the simplex print format, the selection unit selects one of the waiting print jobs corresponding to the largest paper size as the print job to be executed preferentially.

8. The image forming device of claim 6, wherein
   each of the printing conditions includes a paper thickness, and
   when the waiting print jobs are each in the simplex print format, the selection unit selects one of the waiting print jobs corresponding to the greatest paper thickness as the print job to be executed preferentially.

9. The image forming device of claim 1, wherein
   each of the printing conditions includes a condition indicating whether a print format is a color print format or a monochrome print format, and
   when the waiting print jobs include a waiting print job in the color print format and a waiting print job in the monochrome print format, the selection unit selects the waiting print job in the monochrome print format as the print job to be executed preferentially.

10. The image forming device of claim 1 further comprising
    a measurement unit configured to measure the internal temperature, wherein
    when the measured internal temperature exceeds predetermined set temperature lower than the limit temperature, the selection unit selects, from among the waiting print jobs, the print job that is estimated to cause the smallest increase in the internal temperature as the print job to be executed preferentially, based on the printing conditions set on the respective waiting print jobs, and
    when the measured internal temperature does not exceed the set temperature, the selection unit selects one of the waiting print jobs whose time of receipt is the earliest of all the waiting print jobs.

11. The image forming device of claim 1 further comprising
    a monitoring unit configured to monitor an elapsed time since receipt of each print job stored as the waiting print job, wherein
    the control unit controls the execution order so that, when the waiting print jobs include a waiting print job having been received more than a predetermined time period before, the waiting print job having been received more than the predetermined time period before is executed preferentially over the selected print job.

12. The image forming device of claim 1 further comprising
    a count unit configured to count, for each print job stored as the waiting print job, a number of other print jobs executed after receipt of the stored print job, wherein the control unit controls the execution order so that, when the number of the other print jobs executed after receipt of a given print job exceeds a predetermined number, the given print job is executed preferentially over the selected print job.

13. The image forming device of claim 1, wherein the predetermined limit temperature is a temperature at which toner in a developing unit is fusible.

14. An image forming device that has a duplex printing function, comprising:
- a processor for suspending execution of a printing operation to allow internal temperature to decrease when the internal temperature increases and reaches a predetermined limit temperature;
- a storage unit configured to store, each time a print job is received, the received print job therein as a waiting print job;
- a selection unit configured to select, from among a plurality of waiting print jobs, a print job that is estimated to cause the smallest increase in the internal temperature as a print job to be executed preferentially, based on printing conditions set on the respective waiting print jobs; and
- a control unit configured to control execution order of the waiting print jobs so that the selected print job is executed preferentially.

15. The image forming device of claim 14, wherein the predetermined limit temperature is a temperature at which toner in a developing unit is fusible.

* * * * *